June 13, 1939.　　　K. P. BRACE　　　2,162,343
CONTROL MECHANISM
Filed Feb. 18, 1937
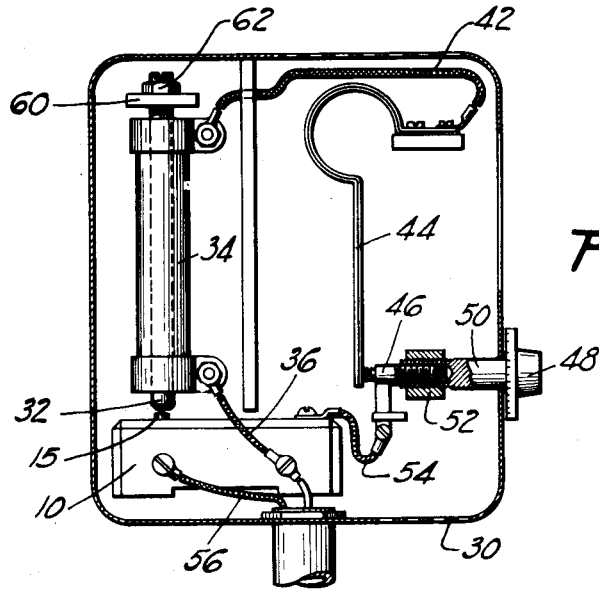
FIG.1
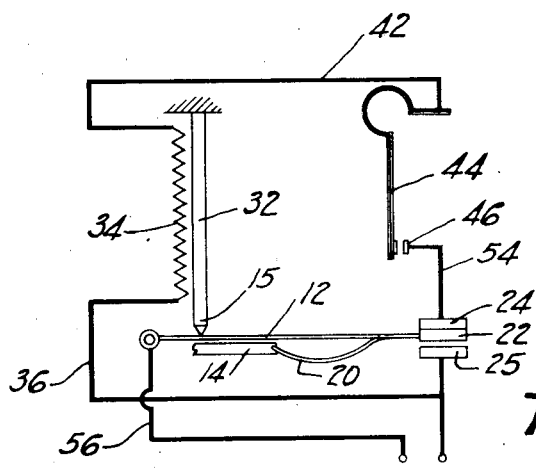
FIG.2
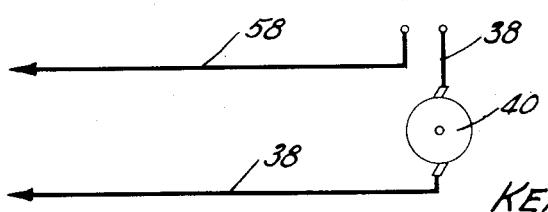
INVENTOR.
KEMPER P. BRACE
BY
ATTORNEY Patented June 13, 1939

2,162,343

UNITED STATES PATENT OFFICE 2,162,343

CONTROL MECHANISM

Kemper P. Brace, South Bend, Ind., assignor to International Engineering Corporation, Chicago, Ill., a corporation of Illinois Application February 18, 1937, Serial No. 126,329

6 Claims. (Cl. 236—68)

This invention relates to control systems such as the thermostatically controlled operating circuit of an oil burner or other heating or cooling system.

An object of the invention is to provide a simple and reliable control which, when rendered effective by the closing of a switch (such as a room thermostat switch) when the temperature drops to a predetermined point, after a predetermined interval of delay turns on the heating or other system being controlled, and thereafter (until the temperature rises enough to cause the system to be turned off again) periodically turns the burner or its equivalent on and off. Thus the heat added while the burner is on, during one "on" interval, is given time to reach the room and affect the room thermostat during the succeeding "off" interval.

This is especially advantageous in heating systems having a considerable heat storage, as otherwise the system remains on until the room temperature has risen sufficiently to act on the thermostat, and then "overshoots" and continues to supply heat for a considerable time after the room is already warm enough.

It is desirable to provide, for this purpose, a non-chattering high-voltage room thermostat, preferably of the socalled "heat anticipation" type, embodying one or more of the features of snap action, high sensitivity, ease of calibration, and low cost.

The above and other objects and features of the invention will be apparent from the following description of the illustrative embodiment shown in the accompanying drawing, in which:

Figure 1 is a side elevation of the control mechanism in the room, with one side of the casing removed; and Figure 2 is a wiring diagram.

In this drawing, for convenience I have shown a well-known commercial snap-action double-acting switch 10, fully described in McGall Patent No. 1,960,020. This switch, as explained in detail in that patent, includes a leaf-spring or yielding lever 12, which has integral therewith tongues 20 seated against a fixed spacer 14. The free end of the spring carries a movable contact 22 between and engageable with either of two fixed contacts 24 or 25. The switch is operated by a plunger 15.

The reference characters used above are the same as those used for the same parts in the McGall patent, and reference may be made to that patent for a more complete description. As explained in that patent, downward pressure on the plunger 15 causes the contact 22 to snap suddenly down against the contact 25, whereas relief of the pressure on the plunger 15 causes the contact 22 to snap suddenly up against the contact 24.

Whether or not this particular switch is used, the switch 10 is mounted in a control box 30, mounted on the wall of the room whose temperature is to be controlled, with the plunger 15 in line with and actuated by a rod 32 of metal having a high coefficient of expansion and which is fixed at its upper end.

An electric heating element 34 surrounds the rod 32; it is connected at one end to a lead 36 from the line wire 38 in which the oil burner motor and control (indicated diagrammatically at 40) are connected. The other end of the heating element is connected by a wire 42 to the fixed end of a bimetallic thermostat 44, the free end of which is opposite and adjustable contact 46.

The contact 46 is adjusted by a control knob 48 on the exterior of the casing 30, the knob having a stem 50 exteriorly threaded into a fixed lug 52 and interiorly threaded over the end of the contact 46. The contact 46 is connected by a wire 54 to the contact 24 of the switch 10. The temperature at which the rooom is to be kept is set by turning the knob 48. The contact 25 is connected to the lead 36 and therefore to the line wire 38.

The fixed end of the switch arm or spring 12 is connected by a lead 56 to the opposite line wire 58.

It will be seen that the circuit for the burner 40 or its equivalent, during operation, is from line wire 38 and device 40 to the contact 25, which at that time engages contact 22, thence through blade or spring 12, and lead 56, to the other line wire 58. This may be called the operating circuit.

There is also a shunt circuit, around the contacts 25—22, from line wire 38 and device 40 through lead 36 to the heating element 34, thence through lead 42 and the bimetallic blade 44 to contact 46 (if closed) and through the contacts 24 and 22 and blade or spring 12 by way of lead 56 to the line wire 58. When this circuit is closed, the heating element 34 serves the double function of heating the rod 32 to cause elongation thereof to operate the switch 10, and of forming a resistance which so reduces the value of the current that motor 40 is not operated and yet is not injured.

In operation, with the parts as shown in Figure 2 both circuits are open and no current is flowing. Assume that the room cools off until the thermostatic switch element, blade 44, engages contact 46, thus closing the shunt circuit described above, and energizing the heating element 34.

After an interval which can be calibrated by adjusting the mounting of the upper end of the rod 32, by threading it into or out of a fixed lug or bracket 60 and then locking it with a locknut 62, the switch 10 is suddenly operated to open the contacts 24—22 and close the contacts 22—25. This breaks the circuit through the heating element 34 and closes the operating circuit, thereby energizing the motor etc. of the burner 40.

The rod 32 now cools off, and, after an interval determined by the rate of contraction of the rod, it actuates the switch 10 to open the contacts 22—25 and close the contacts 22—24. If now the room has warmed up enough to open contacts 44—46, nothing more happens until the temperature again drops. If, however, the contacts 44—46 are still closed, the circuit through the heating element 34 is again closed, and after the desired time-delay the switch 10 is again operated to turn the burner 40 on.

Thus the shunt circuit serves as a time-delay relay for closing the operating circuit when the control switch 44 is closed, and then automatically periodically opening and closing the operating circuit so long as the control switch 44 remains closed, and for finally opening the operating circuit when the control switch 44 is opened.

While one embodiment of my invention has been described in detail, it is not my intention to limit its scope to that particular embodiment, or otherwise than by the terms of the appended claims.

I claim:

1. Control mechanism comprising a double-acting snap-action switch having an actuating member operable to actuate the switch to close one or the other of two circuits, delayed-action electric means for operating said member, and an operating circuit which constitutes the said one circuit closed by said switch when in one position and which has a shunt circuit around the switch which constitutes the said other circuit closed when the switch is in its other position and which shunt circuit includes said electric means and a control switch operated independently of the first switch, whereby the shunt circuit acts as a relay for closing the operating circuit when the control switch is closed and then automatically periodically opening and closing the operating circuit while the control switch remains closed, and for opening the operating circuit when the control switch is opened.

2. Control mechanism comprising a switch having an actuating member operable to actuate the switch to close one or the other of two circuits, electric heating means for causing deformation of said member for operating said switch, and an operating circuit which constitutes the said one circuit closed by said switch when in one position and which has a shunt circuit around the switch which constitutes the said other circuit closed when the switch is in its other position and which shunt circuit includes said electric heating means and a control switch operated independently of the first switch, whereby the shunt circuit acts as a relay for closing the operating circuit when the control switch is closed and then automatically periodically opening and closing the operating circuit while the control switch remains closed, and for opening the operating circuit when the control switch is opened.

3. Control mechanism comprising a double-acting snap-action switch having an actuating member operable to actuate the switch to close one or the other of two circuits, delayed-action electric means for operating said member, and an operating circuit which constitutes the said one circuit closed by said switch when in one position and which has a shunt circuit around the switch which constitutes the said other circuit closed when the switch is in its other position and which shunt circuit includes said electric means and a control switch operated independently of the first switch, whereby the shunt circuit acts as a relay for closing the operating circuit when the control switch is closed and then automatically periodically opening and closing the operating circuit while the control switch remains closed, and for opening the operating circuit when the control switch is opened, said control switch comprising a thermostatic switch adapted to serve as a room thermostat and said operating circuit being adapted to control a heating system or the like.

4. Control mechanism comprising a switch having an actuating member operable to actuate the switch to close one or the other of two circuits, electric heating means for causing deformation of said member for operating said switch, and an operating circuit which constitutes the said one circuit closed by said switch when in one position and which has a shunt circuit around the switch which constitutes the said other circuit closed when the switch is in its other position and which shunt circuit includes said electric heating means and a control switch operated independently of the first switch, whereby the shunt circuit acts as a relay for closing the operating circuit when the control switch is closed and then automatically periodically opening and closing the operating circuit while the control switch remains closed, and for opening the operating circuit when the control switch is opened, said control switch comprising a thermostatic switch adapted to serve as a room thermostat and said operating circuit being adapted to control a heating system or the like.

5. Control mechanism comprising an adjustable room thermostat having contacts opened and closed at predetermined temperatures, a double-acting switch having two fixed contacts and a movable contact between them, a rod adjustably mounted at one end and operatively engaging the switch at the other end, a heating coil sleeved upon said rod, electrical connections from one fixed contact of the switch to one contact of the thermostat and from the other contact of the thermostat to said coil and from said coil to the other of the fixed contacts, and a control circuit connected on one side to the movable contact of the switch and on the other side to said other fixed contact.

6. Control mechanism comprising a room thermostat having contacts opened and closed at predetermined temperatures, a double-acting switch having two fixed contacts and a movable contact between them, a rod fixedly mounted at one end and operatively engaging the switch at the other end, a heating coil sleeved upon said rod, electrical connections from one fixed contact of the switch to one contact of the thermostat and from the other contact of the thermostat to said coil and from said coil to the other of the fixed contacts, and a control circuit connected on one side to the movable contact of the switch and on the other side to said other fixed contact.

KEMPER P. BRACE.